US012796598B2

(12) United States Patent
Coates

(10) Patent No.: US 12,796,598 B2
(45) Date of Patent: Nov. 17, 2026

(54) FLOATING LIFT MECHANISM FOR MOWERS

(71) Applicant: Textron Inc., Providence, RI (US)

(72) Inventor: Carwyn Donald Jacobus Coates, Gloucestershire (GB)

(73) Assignee: TEXTRON INC., Providence, RI (US)

( * ) Notice: Subject to any disclaimer, the term of this patent is extended or adjusted under 35 U.S.C. 154(b) by 231 days.

(21) Appl. No.: 18/789,616

(22) Filed: Jul. 30, 2024

(65) Prior Publication Data

US 2026/0033421 A1 Feb. 5, 2026

(51) Int. Cl.

*A01D 34/74* (2006.01)
*A01D 34/66* (2006.01)
*A01D 101/00* (2006.01)

(52) U.S. Cl.

CPC .............. *A01D 34/74* (2013.01); *A01D 34/66* (2013.01); *A01D 2101/00* (2013.01)

(58) Field of Classification Search

CPC .... A01D 34/74; A01D 34/66; A01D 2101/00; A01D 34/661; A01D 2034/645
See application file for complete search history.

(56) References Cited

U.S. PATENT DOCUMENTS 3,952,464 A 4/1976 Stupak
4,231,124 A 11/1980 Croxton
4,248,452 A 2/1981 Allenbaugh
4,266,443 A 5/1981 McWhorter
4,303,018 A 12/1981 Lehmann
4,342,525 A 8/1982 Mastronuzzi
4,442,660 A * 4/1984 Kuhn .................. A01D 34/662 56/15.9
4,519,570 A 5/1985 Strickland et al.
4,628,757 A 12/1986 Kaesgen
4,641,569 A 2/1987 Smith et al.
4,662,796 A 5/1987 Fanget
4,697,788 A 10/1987 Arzouman
4,781,375 A 11/1988 Nye
4,823,821 A 4/1989 Day
4,878,374 A 11/1989 Nelson
4,881,734 A 11/1989 Nye
4,902,865 A 2/1990 Muller et al.
5,018,902 A 5/1991 Miller et al.
5,184,444 A 2/1993 Warden
5,190,122 A 3/1993 Fletcher et al.
5,210,997 A * 5/1993 Mountcastle, Jr. .. A01D 34/866 56/235
5,301,569 A 4/1994 Droulon
5,454,280 A 10/1995 Droulon (Continued)

*Primary Examiner* — Brad Harcourt
(74) *Attorney, Agent, or Firm* — Foley & Lardner LLP

(57) ABSTRACT

A mower includes a chassis, a tractive element coupled to the chassis, a mower deck coupled to the chassis and including a cutting element, and a floating lift assembly coupling the mower deck to the chassis. The floating lift assembly includes a support link pivotally coupled to the chassis and coupled to the mower deck, a control link having a first end portion pivotally coupled to the support link and a second end portion offset from the first end portion, and an actuator coupling the second end portion of the control link to the chassis. The control link is configured to rotate relative to the actuator and relative to the support link to permit upward movement of the mower deck.

10 Claims, 17 Drawing Sheets

(56) References Cited

U.S. PATENT DOCUMENTS

| | | | | |
|---|---|---|---|---|
| 5,531,149 | A | 7/1996 | Schubert et al. | |
| 5,613,580 | A | 3/1997 | Young | |
| 5,677,658 | A | 10/1997 | Osborn et al. | |
| 5,791,176 | A | 8/1998 | Montesinos Alonso | |
| 6,038,986 | A | 3/2000 | Ransil et al. | |
| 6,467,987 | B1 | 10/2002 | Larsen et al. | |
| 6,527,310 | B1 | 3/2003 | Bellamy | |
| 6,928,812 | B2 | 8/2005 | Donakowski et al. | |
| 7,963,360 | B2 | 6/2011 | Johnson et al. | |
| 8,234,951 | B1 | 8/2012 | Munoz et al. | |
| 8,584,456 | B1 | 11/2013 | Mcknight | |
| 9,783,977 | B2 | 10/2017 | Alqasimi et al. | |
| 9,978,292 | B2 | 5/2018 | Santoro | |
| 10,334,780 | B2 * | 7/2019 | Bartel | A01D 34/64 |
| 10,422,124 | B1 | 9/2019 | Alfattani et al. | |
| 10,501,937 | B2 | 12/2019 | Karstens | |
| 11,009,109 | B2 | 5/2021 | Martyn | |
| 2001/0013742 | A1 | 8/2001 | Lu | |
| 2002/0100266 | A1 * | 8/2002 | Greenwell | A01D 34/4161 56/15.8 |
| 2004/0130846 | A1 | 7/2004 | Czeppel et al. | |
| 2005/0050929 | A1 | 3/2005 | Meyerle | |
| 2006/0278858 | A1 | 12/2006 | Brocchini | |
| 2008/0258987 | A1 | 10/2008 | Meschini | |
| 2008/0264120 | A1 | 10/2008 | Melz et al. | |
| 2010/0089191 | A1 | 4/2010 | Marin Martinod | |
| 2012/0297763 | A1 | 11/2012 | Mankame et al. | |
| 2013/0025447 | A1 | 1/2013 | Crowder | |
| 2015/0107976 | A1 | 4/2015 | Levatich et al. | |
| 2016/0271538 | A1 | 9/2016 | Joung et al. | |
| 2017/0071132 | A1 * | 3/2017 | Dunn | A01D 84/00 |
| 2017/0204950 | A1 | 7/2017 | Sobolak | |
| 2020/0260639 | A1 * | 8/2020 | Walker | A01D 34/74 |
| 2023/0190005 | A1 | 6/2023 | Atkinson | |

* cited by examiner

Fully Extended, Fully Lowered

Fully Extended, Raised

Fully Retracted

Fully Retracted

FLOATING LIFT MECHANISM FOR MOWERS

BACKGROUND

The present disclosure relates generally to outdoor equipment, such as mowers or golf cars. More specifically, the present disclosure relates to a lift assembly for a deck of a mower.

Mowers are used to maintain vegetation (e.g., grass, clover, weeds, etc.) at a desired height. To accomplish this, mowers include at least one mower deck having a cutting element that is driven by a motor. A cutting height of the mower deck may be set by an operator to provide a desired trimmed height of the vegetation. When traveling at high speeds (e.g., between jobsites), a user may raise the mower deck to avoid contact between the mower deck and the ground. The height of the mower deck may be set by a mower deck actuator.

SUMMARY

One embodiment relates to a mower. The mower includes a chassis, a tractive element coupled to the chassis, a mower deck coupled to the chassis and including a cutting element, and a floating lift assembly coupling the mower deck to the chassis. The floating lift assembly includes a support link pivotally coupled to the chassis and coupled to the mower deck, a control link having a first end portion pivotally coupled to the support link and a second end portion offset from the first end portion, and an actuator coupling the second end portion of the control link to the chassis. The control link is configured to rotate relative to the actuator and relative to the support link to permit upward movement of the mower deck.

Another embodiment relates to a floating lift assembly for a coupling a mower deck to a frame of a mower. The floating lift assembly includes a support member configured to be pivotally coupled to the frame and configured to support the mower deck, a linear actuator configured to be pivotally coupled to the frame, and a control member pivotally coupled to the linear actuator and to the support member. The control member is movable relative to the support member to permit upward movement of the mower deck while a length of the linear actuator remains constant.

Still another embodiment relates to a vehicle. The vehicle includes a frame, a tractive element coupled to the frame, a mower deck coupled to the frame and including a cutting element, and a lift assembly coupling the mower deck to the frame. The lift assembly includes a support member pivotable relative to the frame about a first axis and configured to support the mower deck, a linear actuator pivotable relative to the frame about a second axis, and a control member pivotable relative to the linear actuator about a third axis and pivotable relative to the support member about a fourth axis. The linear actuator is configured to retract to decrease a distance between the second axis and the third axis and raise the mower deck. The control member is configured to pivot about the fourth axis to permit raising the mower deck while the distance between the second axis and the third axis remains constant.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1A:
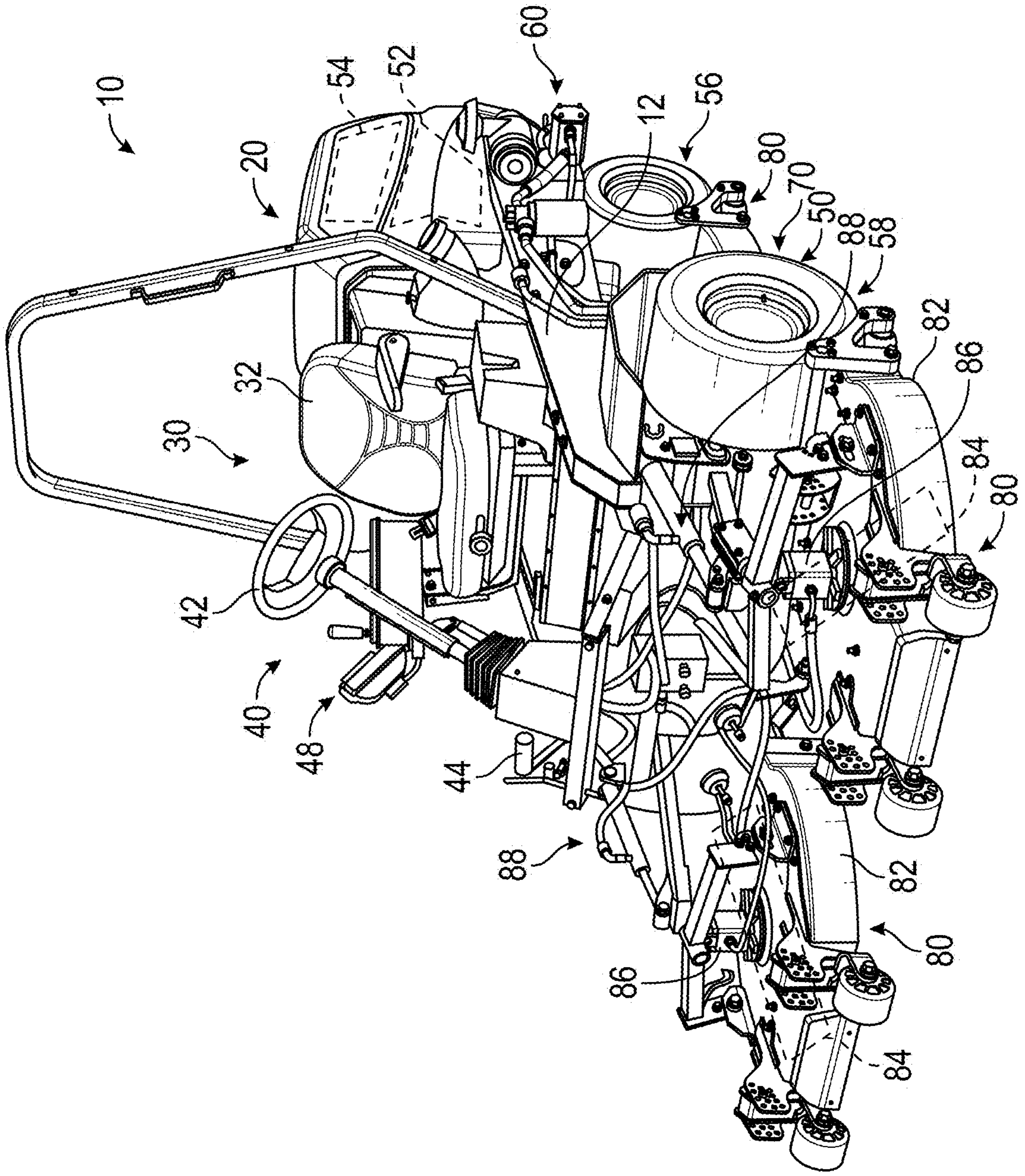
FIG. 1A is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a mower of the present disclosure includes a chassis, a mower deck including a cutting element, and a floating lift assembly that controls a height of the mower deck relative to the chassis. During normal operation, the mower deck uses the cutting element to trim vegetation (e.g., grass, clover, weeds, etc.). A user may control a deck actuator of the lift assembly to set a cutting height of the mower deck or to raise the mower deck to a travel position (e.g., a height where the mower deck is out of contact with the vegetation). When the mower deck is at a cutting height and the mower passes over an obstacle (e.g., an incline or decline in the ground surface, and object, etc.), the mower deck may be forced upward. The floating lift assembly prevents downward movement of the mower deck below the set height but permits free upward movement of the mower deck. Accordingly, the floating lift assembly permits the mower deck to quickly rise over the obstacle and return back to the set height without damage to any components or a gap in the cutting operation. When another mower that lacks this floating capability encounters an obstacle, the mower resists the upward movement of the mower deck, producing stresses within the mower deck.

Overall Vehicle

As shown in FIGS. 1A-3, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; a series of implements, mower assemblies, or cutting units, shown as mower decks 80; one or more sensors, shown as sensors 90; and a vehicle control system, shown as vehicle controller 100, coupled to the operator controls 40, the driveline 50, the suspension system 60, the braking system 70, the mower decks 80, and the sensors 90. In other embodiments, the vehicle 10 includes more or fewer components.

Figure 1B:
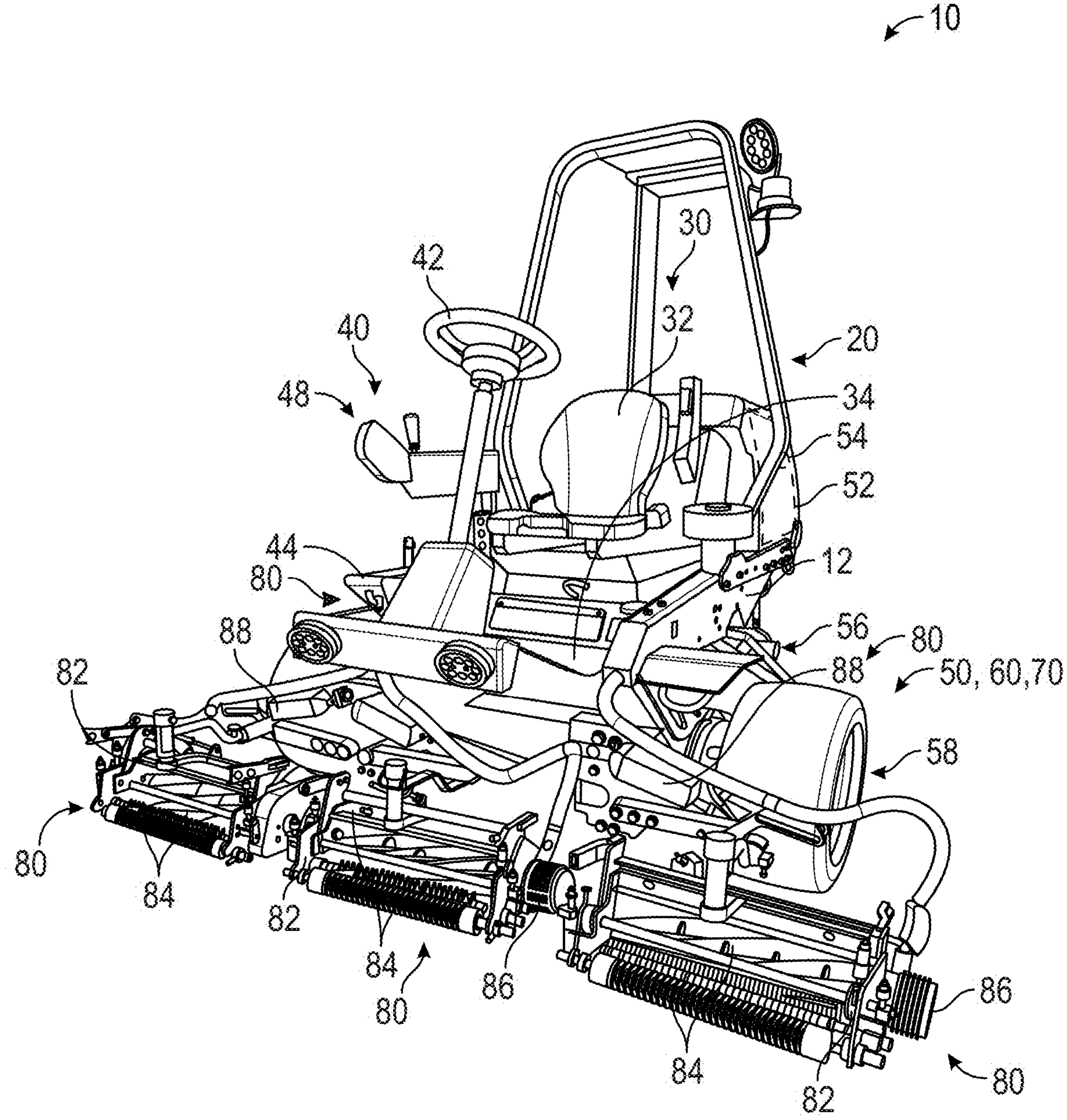
FIG. 1B is a perspective view of a vehicle, according to another exemplary embodiment.

According to an exemplary embodiment, the vehicle 10 is an off-road machine or vehicle. As shown in FIGS. 1A and 1B, the vehicle 10 is configured as a mower (e.g., a lawnmower, a turf mower, a push mower, a ride-on mower, a stand-on mower, or another type of mower). In other embodiments, the off-road machine or vehicle is a lightweight or recreational machine or vehicle such as a golf cart, golf cars, an all-terrain vehicle ("ATV"), a utility task vehicle ("UTV"), and/or another type of lightweight or recreational machine or vehicle. In some embodiments, the off-road machine or vehicle is a chore product such as aerator, turf sprayer, bunker rake, and/or another type of chore product (e.g., that may be used on a golf course).

According to the exemplary embodiments shown in FIGS. 1A and 1B, the occupant seating area 30 includes a single seat, shown as driver seat 32. In some embodiments, the occupant seating area 30 includes additional seats (e.g., a passenger seat, an additional row of seats, etc.). According to the exemplary embodiments shown in FIGS. 1A and 1B, the driver seat 32 is laterally centered on the body 20 and facing forward. In some embodiments, the driver seat 32 is facing rearward or otherwise positioned. In some embodiments, the occupant seating area 30 is omitted (e.g., the vehicle 10 is configured as a push mower). A portion of the frame 12 defines a platform, deck, or standing area, shown as operator platform 34. The operator platform 34 may extend forward of the driver seat 32 such that the occupant can rest their feet on the operator platform 34 while seated in the driver seat 32. The operator platform 34 may support the occupant as the occupant enters or exits the driver seat 32.

Figure 2:
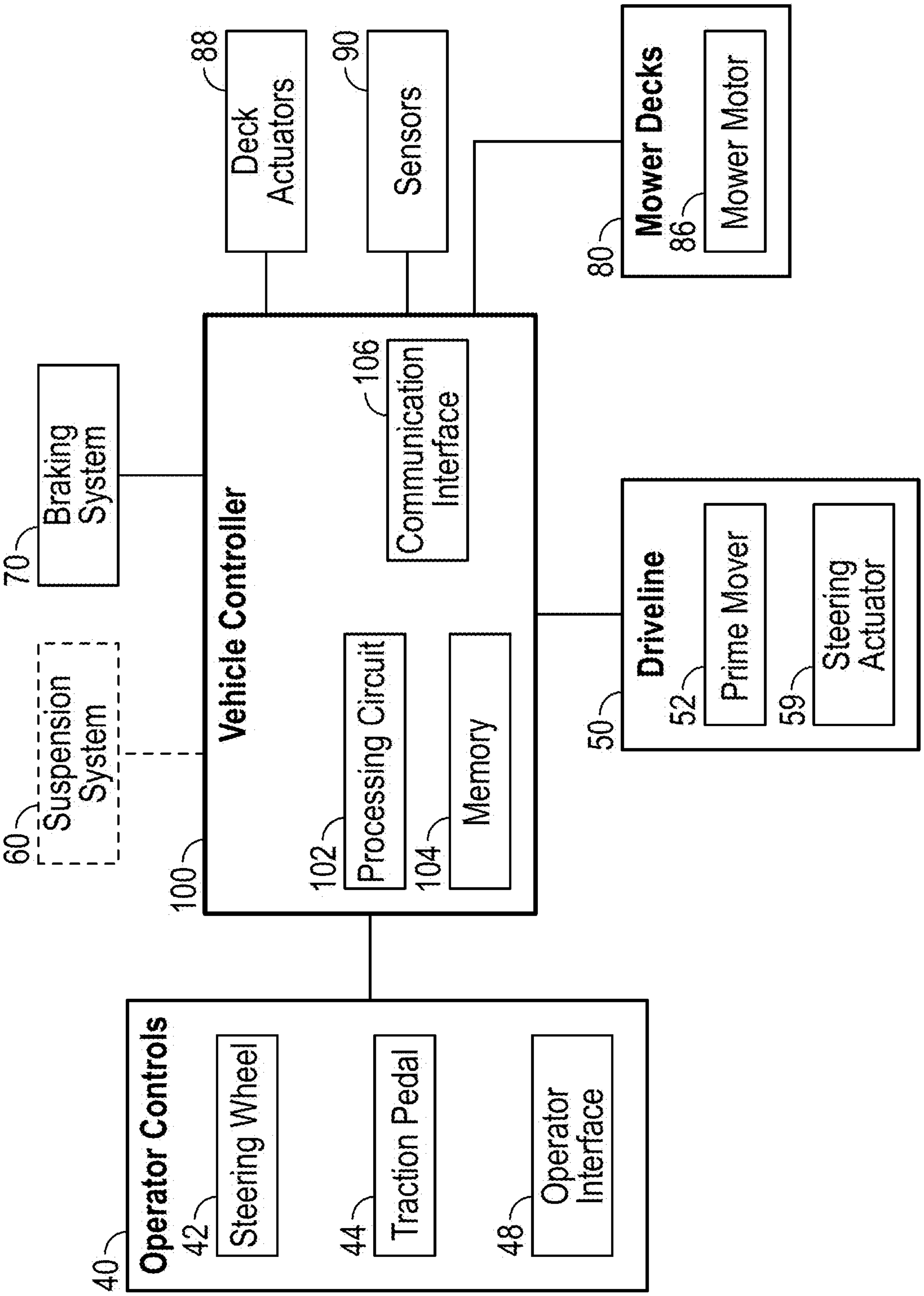
FIG. 2 is a schematic block diagram of the vehicle of FIG. 1A, according to an exemplary embodiment.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower a mower deck 80, etc.). As shown in FIGS. 1A, 1B, and 2, the operator controls 40 include a steering interface (e.g., a steering wheel, joystick(s), etc.), shown steering wheel 42, an accelerator interface and/or braking interface (e.g., a pedal, a throttle, etc.), shown as traction pedal 44, and one or more additional interfaces, shown as operator interface 48. The steering wheel 42 may be used by an operator to indicate a desired steering direction of the vehicle 10. The traction pedal 44 may be used to control the speed and direction of travel of the vehicle 10. By way of example, pressing the traction pedal 44 in a first direction may cause the driveline 50 to move the vehicle 10 forward, and pressing the traction pedal 44 in an opposing section direction may cause the driveline 50 to move the vehicle 10 rearward. Returning the traction pedal 44 to a middle or neutral position may cause the braking system 70 and/or the driveline 50 to slow or stop the vehicle 10 or to hold the vehicle 10 in place. Alternatively, the operator interface 48 may include a pair of handles that act as a steering interface and control the driveline 50 in a zero-turn configuration (e.g., a left joystick to control the left side of the driveline 50 and a right joystick to control a right side of the driveline 50). The operator interface 48 may be used to control operation of the mower decks 80 (e.g., changing a cutting speed of a mower deck 80, changing a cutting height of a mower deck 80, etc.). The operator interface 48 may include one or more displays and one or more input devices. The one or more displays may be or include a touchscreen, an LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1A, 1B, and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is one or more electric motors and the energy storage 54 is a battery system. In some embodiments, the driveline 50 is a fuel cell electric driveline whereby the prime mover 52 is one or more electric motors and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiments shown in FIGS. 1A and 1B, the rear tractive assembly 56 includes rear tractive elements and the front tractive assembly 58 includes front tractive elements that are configured as wheels. In some embodiments, the rear tractive elements and/or the front tractive elements are configured as tracks. In some embodiments, the driveline 50 is omitted, and the vehicle 10 is propelled by an operator (e.g., the vehicle 10 is configured as a push mower).

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., based on an input from the steering wheel 42 and using a steering actuator 59 that controls the orientation of one or more wheels). In some embodiments, both the rear tractive assembly 56 and the front tractive assembly 58 are fixed and not steerable (e.g., employ skid steer operations). By way of example, the driveline 50 may include a hydrostatic transmission that permits independent driving of the left and right sides of the driveline 50.

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, the driveline 50 is a hydrostatic transmission that performs braking by using hydraulic motors to oppose movement of the tractive elements.

Referring to FIGS. 1A and 1B, the vehicle 10 includes a series of mower decks 80 (e.g., cutting units). Each mower deck 80 includes a deck, housing, or enclosure, shown as housing 82, and a cutting element 84 (e.g., a blade, a flail, a reel, etc.) movably coupled to the housing 82. Specifically, the vehicle of FIG. 1A illustrates a vehicle 10 in which the mower decks 80 each include a cutting element 84 configured as a blade that rotates about a substantially vertical axis. FIG. 1B illustrates an alternative configuration in which the cutting elements 84 are configured as reels that each rotate about a substantially horizontal axis. Except as otherwise specified, the vehicle 10 of FIG. 1A may be substantially similar to the vehicle 10 of FIG. 1B. Accordingly, an description of the vehicle 10 of FIG. 1A may apply to the vehicle 10 of FIG. 1B, except as otherwise specified.

Referring to FIGS. 1A and 1B, the housing 82 may open downward to expose the cutting element 84 to vegetation below the housing 82. A motor or actuator (e.g., an electric motor, a hydraulic motor, etc.), shown as mower motor 86, is coupled to the housing 82 and drives movement (e.g., rotation, oscillation, etc.) of the cutting element 84. While driven by the mower motor 86, the cutting element 84 crushes, mulches, removes, or otherwise trims vegetation beneath the housing 82. Alternatively, the cutting element 84 may be driven by the prime mover 52 (e.g., through a power take off).

The vehicle 10 includes a series of linear actuators or height adjustment actuators, shown as deck actuators 88, each coupled to the frame 12 and to one or more of the mower decks 80. The deck actuators 88 permit control over a height of the corresponding mower deck 80 relative to the frame 12. The deck actuators 88 may set a cutting height of the mower deck 80. The cutting height represents a final height of vegetation that is trimmed by the mower deck 80. The deck actuators 88 may move the mower deck 80 to a travel position above the cutting height, in which the mower deck 80 is moved out of engagement with the vegetation and the ground surface. The travel position may be used when the vehicle 10 is traveling between job sites and/or the user does not wish to be trimming vegetation.

The sensors 90 may include various sensors positioned about the vehicle 10 to acquire vehicle information or vehicle data regarding operation of the vehicle 10, or the location thereof. The sensors 90 may include various sensors positioned about the vehicle 10 to acquire environment data regarding the environment surrounding the vehicle 10. By way of example, the sensors 90 may include an accelerometer, a gyroscope, a compass, a position sensor (e.g., a GPS sensor, an RTK sensor, etc.), an inertial measurement unit ("IMU"), suspension sensor(s), wheel sensors, an audio sensor or microphone, a camera, an optical sensor, a proximity detection sensor, linear potentiometers, and/or other sensors to facilitate acquiring vehicle information, vehicle data, or environment data regarding operation of the vehicle 10, the location thereof, and/or the surrounding environment. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

As shown in FIG. 2, the vehicle controller 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle controller 100 includes a processing circuit 102, a memory 104, and a communication interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle controller 100 may represent a collection of processing devices. In such cases, the processing circuit 102 represents the collective processors of the devices, and the memory 104 represents the collective storage devices of the devices.

In one embodiment, the vehicle controller 100 is configured to selectively engage, selectively disengage, control, or otherwise communicate with components of the vehicle 10 (e.g., via the communication interface 106, a controller area network ("CAN") bus, etc.). According to an exemplary embodiment, the vehicle controller 100 is coupled to (e.g., communicably coupled to) components of the operator controls 40 (e.g., the steering wheel 42, the traction pedal 44, the brake 46, the operator interface 48, etc.), components of the driveline 50 (e.g., the prime mover 52), components of the braking system 70, the mower decks 80, the deck actuators 88, and the sensors 90. By way of example, the vehicle controller 100 may send and receive signals (e.g., control signals, location signals, etc.) with the components of the operator controls 40, the components of the driveline 50, the components of the braking system 70, the sensors 90, and/or remote systems or devices (via the communication interface 106 as described in greater detail herein).

The communication interface 106 facilitate communications (e.g., wired or wireless communications) between the vehicle 10 and other devices (e.g., other vehicles 10, the user sensors 220, the user portal 230, the remote systems 240, etc.). By way of example, the communications interface 130 may be configured to employ one or more types of wireless communications protocols including Bluetooth, Wi-Fi, radio, cellular, and/or other suitable wireless communications protocols.

Site Monitoring and Control System

Figure 3:
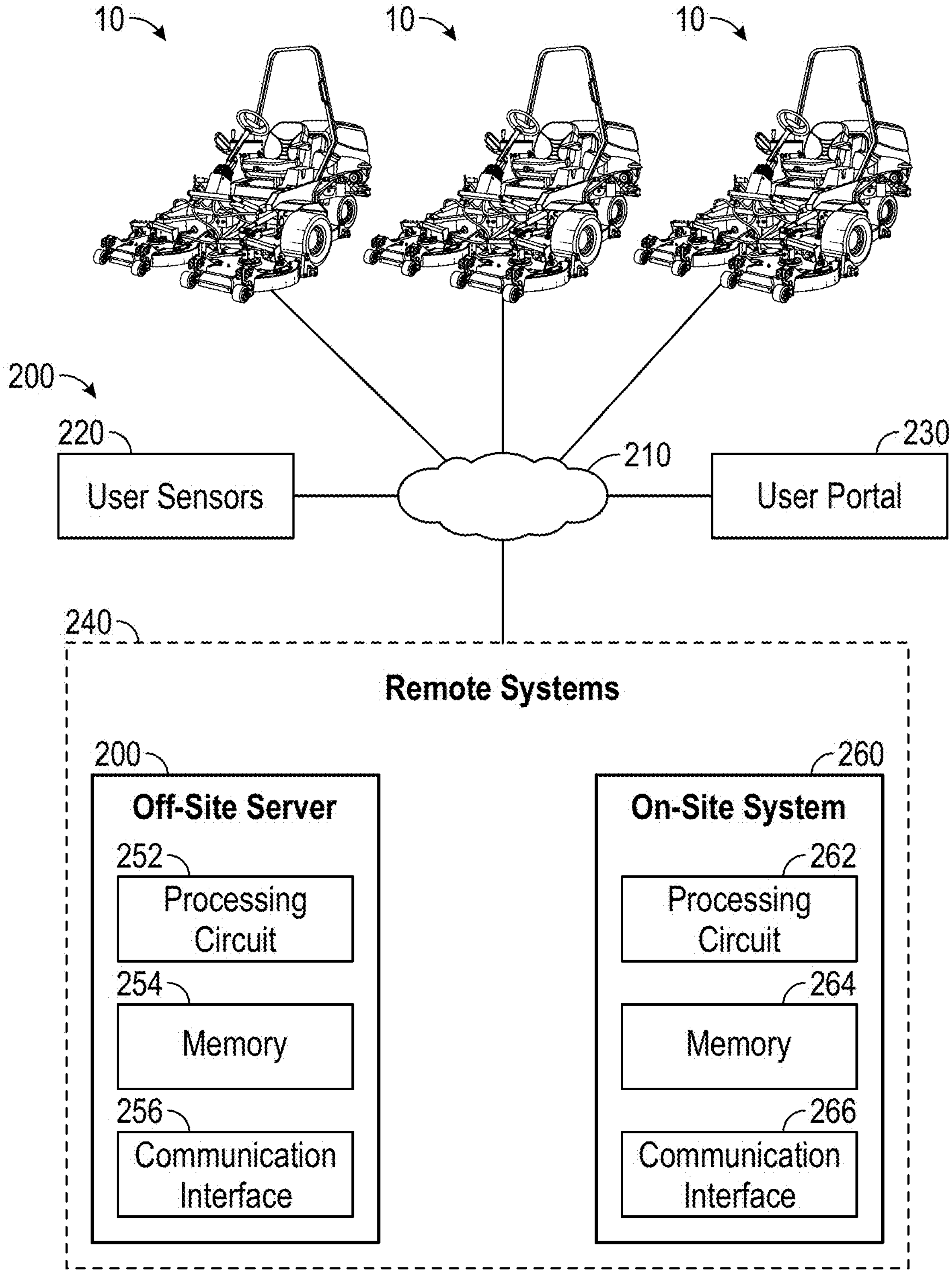
FIG. 3 is a is schematic block diagram of a site monitoring and control system including a plurality of the vehicles of FIG. 1A, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210 (e.g., using the communication interface 106).

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, hear rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons braking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). The user portal 230 may be or may be accessed via a computer, laptop, smartphone, tablet, or the like.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle controllers 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Floating Lift Mechanism

Referring to FIG. 3, the vehicle 10 includes a floating lift mechanism or floating lift assembly, shown as lift assembly 300. The lift assembly 300 is configured to raise, lower, and support at least one mower deck 80. As shown, the lift assembly 300 movably couples the mower deck 80 to the frame 12. The lift assembly 300 includes a deck actuator 88 to control operation of the lift assembly 300 (e.g., to raise and lower the mower deck 80). In some embodiments, the vehicle 10 includes multiple lift assemblies 300. By way of example, the vehicle 10 may include a lift assembly 300 for each of the mower decks 80. In one such example, the lift assemblies 300 facilitate independent control over the height of each mower deck 80.

The lift assembly 300 includes a pair of links, supports, connectors, or members, shown as support link 302 and control link 304. In some embodiments, the lift assembly 300 includes multiple support links 302 and/or control links 304 performing similar functions. By way of example, the lift assembly 300 may include a support link 302 on each side of a deck actuator 88. Any description with respect to a single support link 302 or control link 304 may apply similarly to embodiments of the lift assembly 300 including multiple support links 302 and/or control links 304.

A protrusion, shown as stop 306, is fixedly coupled to the support link 302. The frame 12 includes a pair of stationary connection points (e.g., bosses, clevises, pins, etc.), shown as lower mounting point 310 and upper mounting point 312. The support link 302 is pivotally coupled to the lower mounting point 310, and the housing 82 is pivotally coupled to the support link 302. Accordingly, the support link 302 couples the mower deck 80 to the frame 12. A proximal end of the deck actuator 88 is pivotally coupled to the upper mounting point 312, and a distal end of the deck actuator 88 is pivotally coupled to a proximal end of the control link 304. A distal end of the control link 304 is pivotally coupled to the support link 302. Accordingly, the support link 302 is coupled to the upper mounting point 312 by the deck actuator 88 and the control link 304.

During operation, the deck actuator 88 applies a tensile force onto the control link 304 to control a height of the mower deck 80. When the length of the deck actuator 88 is held constant (e.g., due to friction within the deck actuator 88, application of a holding torque by a motor, compression of a hydraulic fluid, etc.), the deck actuator 88 and the control link 304 act in tension to limit downward movement of the support link 302. Retracting the deck actuator 88 decreases a distance between the control link 304 and the upper mounting point 312, raising the support link 302 and the mower deck 80. Extending the deck actuator 88 increases the distance between the control link 304 and the upper mounting point 312, lowering the support link 302 and the mower deck 80.

Beneficially, the pivoting arrangement of the lift assembly 300 permits floating movement of the mower deck 80. In the configuration shown in FIG. 4, the control link 304 engages the stop 306 to limit rotation of the control link 304 toward the support link 302. Engagement between the control link 304 and the stop 306 limits downward movement of the support link 302 and the mower deck 80 for a given extended length of the deck actuator 88. By way of example, the lift assembly 300 may be held in this configuration by a gravitational force on the mower deck 80.

If an upward force is applied to the mower deck 80, the control link 304 rotates away from the stop 306, and the support link 302 rotates upward to permit free upward movement of the mower deck 80. By way of example, such an upward force may be applied to the mower deck 80 when the vehicle 10 moves over an obstacle (e.g., a log, a rock, etc.) or change in terrain (e.g., a hill, a bump, etc.) that decreases a distance between the mower deck 80 and the ground surface below. By permitting free upward movement of the mower deck 80, the mower freely floats above the obstacle or change in terrain, preventing damage to the mower deck 80 or an unintended change in cutting height. Once the upward force is no longer applied (e.g., because the obstacle has passed), the gravitational force on the mower deck 80 may return the lift assembly 300 to the configuration shown in FIG. 3.

Figure 4:
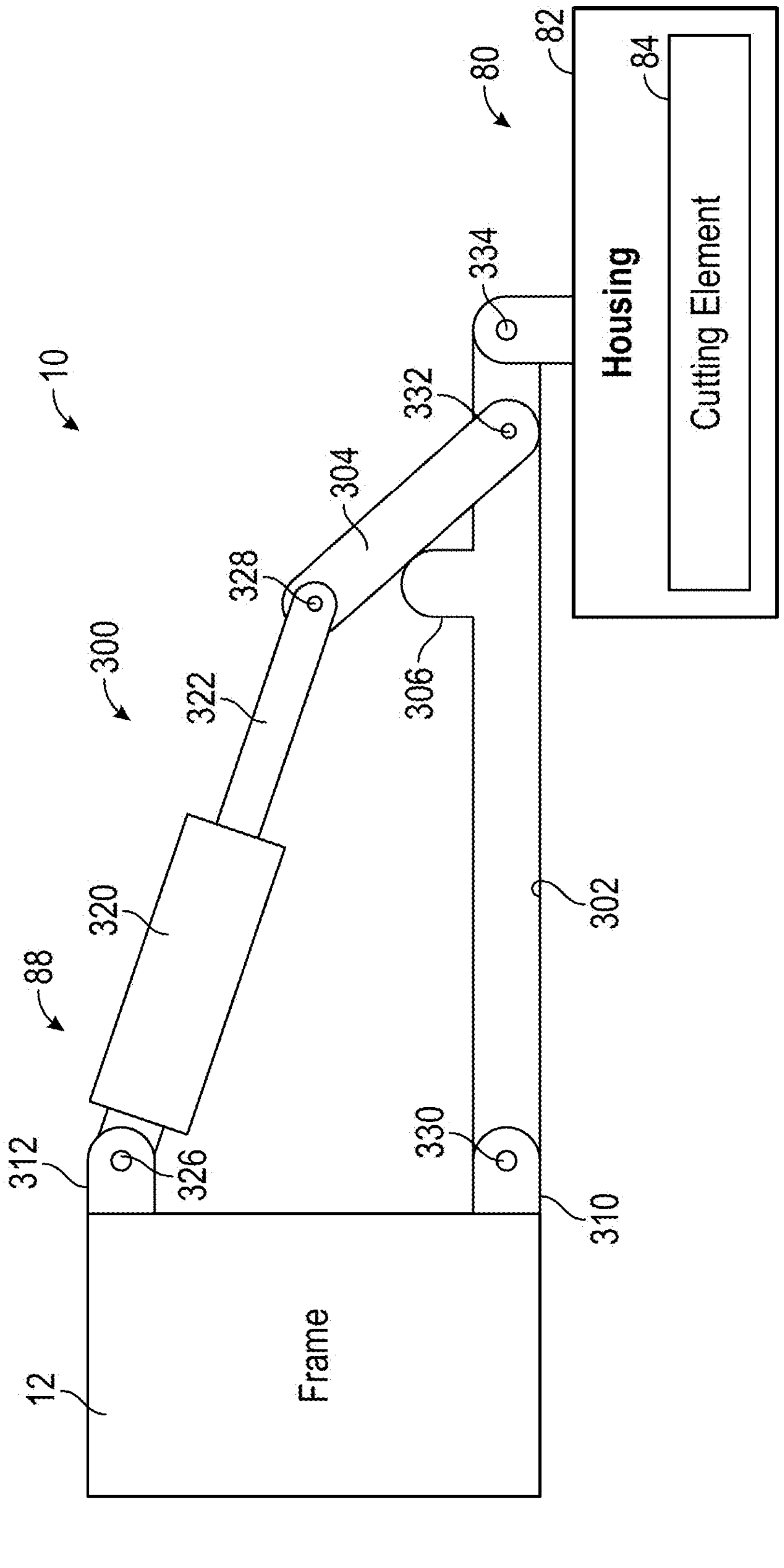
FIG. 4 is schematic side view of a lift assembly for a mower deck of the vehicle of FIG. 1A.

Referring to FIGS. 5-9, an arrangement of the lift assembly 300 of FIG. 4 is shown according to an exemplary embodiment. The lift assembly 300 of FIGS. 5-9 may be substantially similar in structure and function to the lift assembly 300 of FIG. 4 except as otherwise specified herein.

Figure 5:
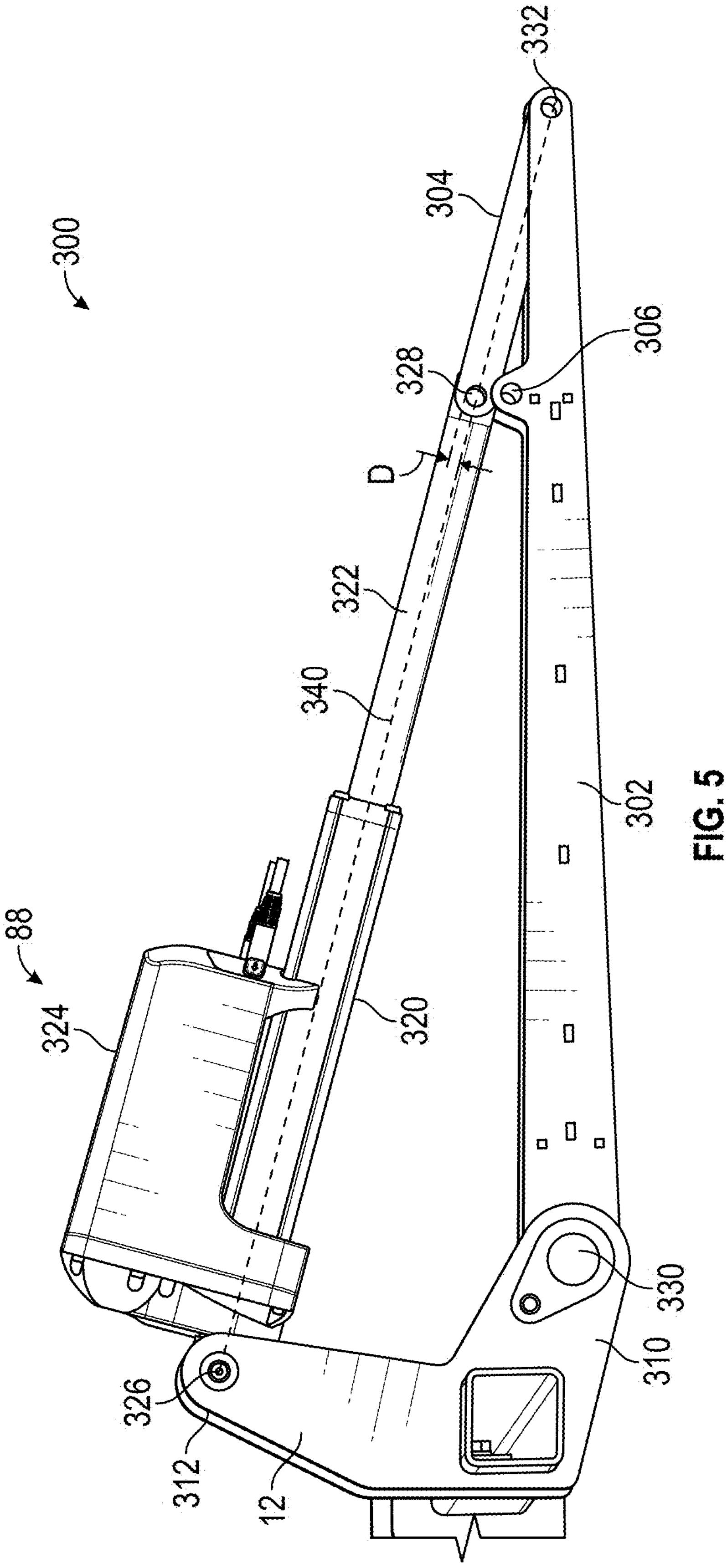
FIGS. 5-9 are side views of the lift assembly of FIG. 4 moved to various positions, according to an exemplary embodiment.

Referring to FIG. 5, the deck actuator 88 is a linear actuator including a first portion or body portion (e.g., a cylinder, a body, a receiver, etc.), shown as body 320, and a second portion or rod portion (e.g., a rod, a sliding portion, etc.), shown as rod 322. The rod 322 is slidably received within the body 320. During operation, the rod 322 is retracted within the body 320 or extended out of the body 320 to retract or extend the deck actuator 88. A driver, shown as electric motor 324, is coupled to the body 320 and configured to control extension and retraction of the rod 322. By way of example, the electric motor 324 may receive electrical energy (e.g., as controlled by the vehicle controller 100) and output rotational mechanical energy to drive extension and/or retraction of the rod 322. In other embodiments, the deck actuator 88 is another type of linear actuator. By way of example the deck actuator 88 may be a hydraulic cylinder or a pneumatic cylinder driven by a supply of pressurized fluid (e.g., oil or air).

As shown in FIG. 5, the body 320 is pivotally coupled to the upper mounting point 312 and configured to rotate relative to the frame 12 about a lateral axis of rotation, shown as axis 326. The axis 326 extends through a proximal end portion of the body 320. The rod 322 is pivotally coupled to a proximal end portion of the control link 304 and configured to rotate relative to the control link 304 about a lateral axis of rotation, shown as axis 328. The axis 328 extends through a distal end portion of the rod 322 and the proximal end portion of the control link 304. In other embodiments, the deck actuator 88 is inverted such that the rod 322 is coupled to the upper mounting point 312 and the body 320 is coupled to the lower mounting point 310.

The proximal end portion of the support link 302 is pivotally coupled to the lower mounting point 310 and configured to rotate relative to the frame 12 about a lateral axis of rotation, shown as axis 330. The axis 330 extends through a proximal end portion of the support link 302. The support link 302 is pivotally coupled to a distal end portion of the control link 304 and configured to rotate relative to the control link 304 about a lateral axis of rotation, shown as axis 332. The axis 332 extends through the support link 302 and the distal end portion of the control link 304. The housing 82 of the mower deck 80 is pivotally coupled to the support link 302 and configured to rotate relative to the support link 302 about a lateral axis of rotation, shown as axis 334. The axis 334 extends through the support link 302. By pivotally coupling the housing 82 to the support link 302, the housing 82 may rotate under the influence of gravity to ensure that the cutting element 84 remains level as the support link 302 moves up and down.

In some embodiments, the axis 326, the axis 328, the axis 330, the axis 332, and axis 334 extend substantially parallel to one another. The axis 326 is offset from the axis 328 along a length of the deck actuator 88. A distance between the axis 326 and the axis 328 varies as the deck actuator 88 extends and retracts. The axis 332 is offset from the axis 328 along the length of the control link 304. In some embodiments, the control link 304 is solid (e.g., stiff, rigid, etc.) such that the distance between the axis 332 and the axis 328 is constant. The axis 332 is offset from the axis 330 along the length of the support link 302. In some embodiments, the support link 302 is solid (e.g., stiff, rigid, etc.) such that the distance between the axis 332 and the axis 330 is constant.

As shown in FIG. 4, the axis 334 is offset from the axis 330 along the length of the support link 302 such that rotation of the support link 302 raises or lowers the mower deck 80. In some embodiments, the axis 332 is positioned between the axis 330 and the axis 334. In other embodiments, the axis 334 is positioned between the axis 330 and the axis 332. In yet other embodiments, the axis 334 is coaxial with the axis 332. Although the connection between the mower deck 80 and the support link 302 is omitted from FIGS. 5-9 for ease of illustration, it should be understood that the axis 334 may be positioned at any location along the length of the support link 302.

The stop 306 is fixedly coupled to the support link 302 such that a position of the stop 306 relative to the axis 330 and the axis 332 is fixed. In some embodiments, the stop 306 is fastened to the support link 302. In other embodiments, the stop 306 is integrally formed with the support link 302 as a single continuous piece. The stop 306 extends away from the support link 302 and toward the deck actuator 88 and the control link 304 (e.g., upward). The stop 306 is positioned to limit movement of the deck actuator 88 and the control link 304 (e.g., movement of the axis 328) toward the support link 302. As shown, the stop 306 is positioned to engage the underside of the control link 304 to limit movement of the control link 304 toward the support link 302. In other embodiments, the stop 306 is positioned to engage the underside of the deck actuator 88 to limit movement of the deck actuator 88 toward the support link 302. In other embodiments, the stop 306 is coupled to the control link 304 and positioned to engage the support link 302.

Referring to FIGS. 5-9, a range of motion of the lift assembly 300 is shown according to an exemplary embodiment. In FIG. 5, the lift assembly 300 is shown in a fully extended, fully lowered position. In the fully extended, fully lowered position the deck actuator 88 is fully extended, and the control link 304 engages the stop 306. Accordingly, the fully extended, fully lowered position may represent the lowest achievable position of the mower deck 80.

Figure 6:
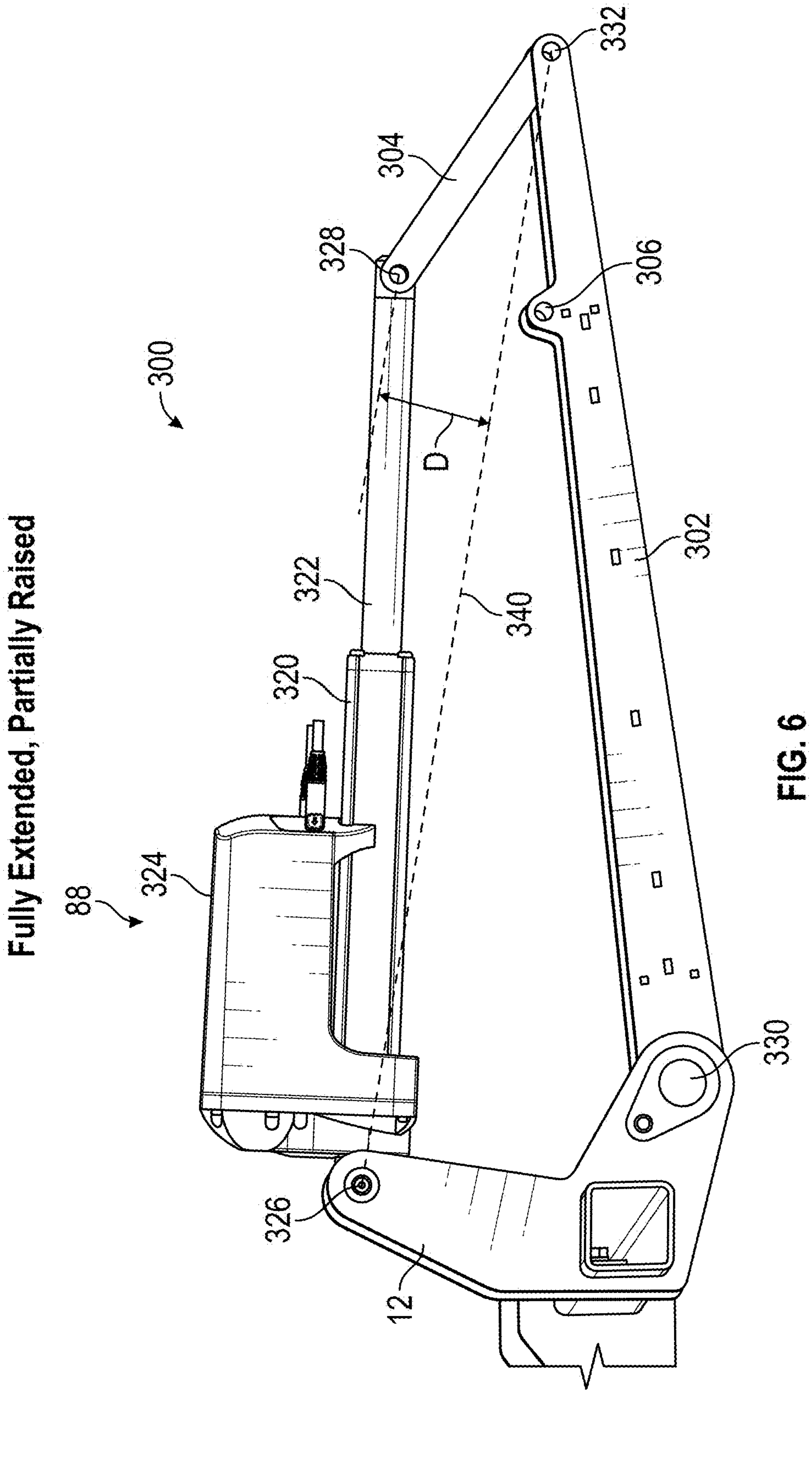

In FIG. 6, the lift assembly 300 is shown in a fully extended, partially raised position. In the fully extended, partially raised position the deck actuator 88 is fully extended and the control link 304 is lifted away from the stop 306. The fully extended, partially raised position may be reached by applying an upward force on the mower deck 80 while the deck actuator 88 is fully extended. While in the fully extended, partially retracted position, the mower deck 80 is free to move up and down under the application of external forces (e.g., the mower deck 80 is floating). If released, the mower deck 80 may return to the fully extended, fully lowered position due to the force of gravity on the mower deck 80.

Figure 7:
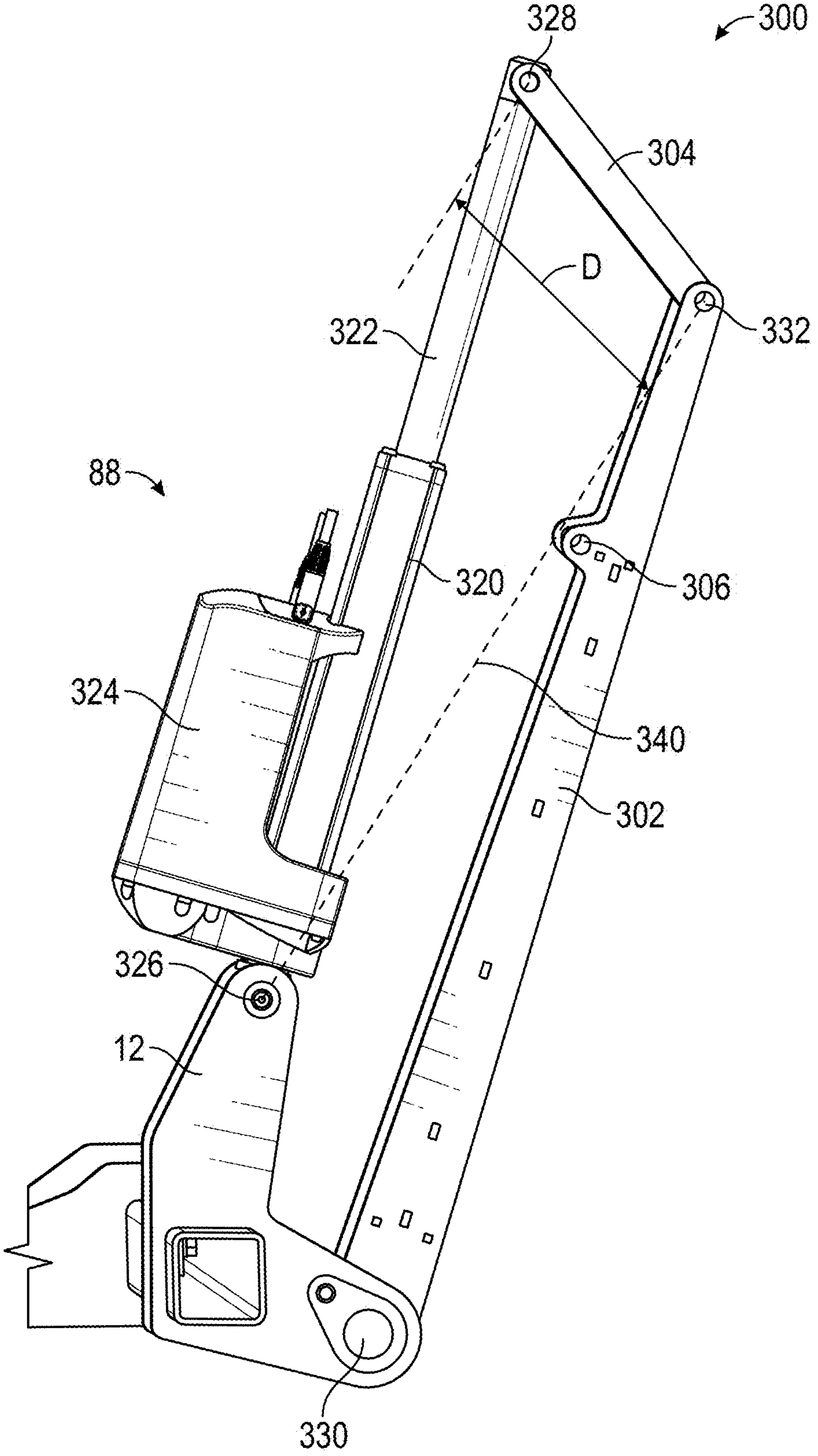

In FIG. 7, the lift assembly 300 is shown in a fully extended, raised position. In the fully extended, raised position the deck actuator 88 is fully extended and the control link 304 is lifted even further away from the stop 306. The fully extended, raised position may be reached by continuing to apply the upward force on the mower deck 80 while the deck actuator 88 is fully extended. If released, the mower deck 80 may return to the fully extended, fully lowered position due to the force of gravity on the mower deck 80. In some embodiments, the fully extended, raised position is the highest position that can be reached by the mower deck 80. In this instance, the mower deck 80 is free to move down under the application of external forces, but the mower deck 80 cannot be raised further (e.g., due to a geometric locking of the linkages of the lift assembly 300).

Retracting the deck actuator 88 causes the control link 304 to be drawn toward the frame 12. This draws the support link 302 upward, raising the mower deck 80. In such a configuration, the mower deck 80 is still permitted to be moved freely upward (e.g., permitted to float), however the stop 306 contacts the control link 304 at a higher position of the mower deck 80, such that the support link 302 and the mower deck 80 cannot be lowered as far as shown in FIG. 5. Accordingly, a cutting height or operating height of the mower deck 80 may be adjusted by retracting or extending the deck actuator 88. By way of example, a user may command the deck actuator 88 to extend or retract through the operator controls 40 (e.g., by providing a command to raise or lower the mower deck 80).

Figure 8:
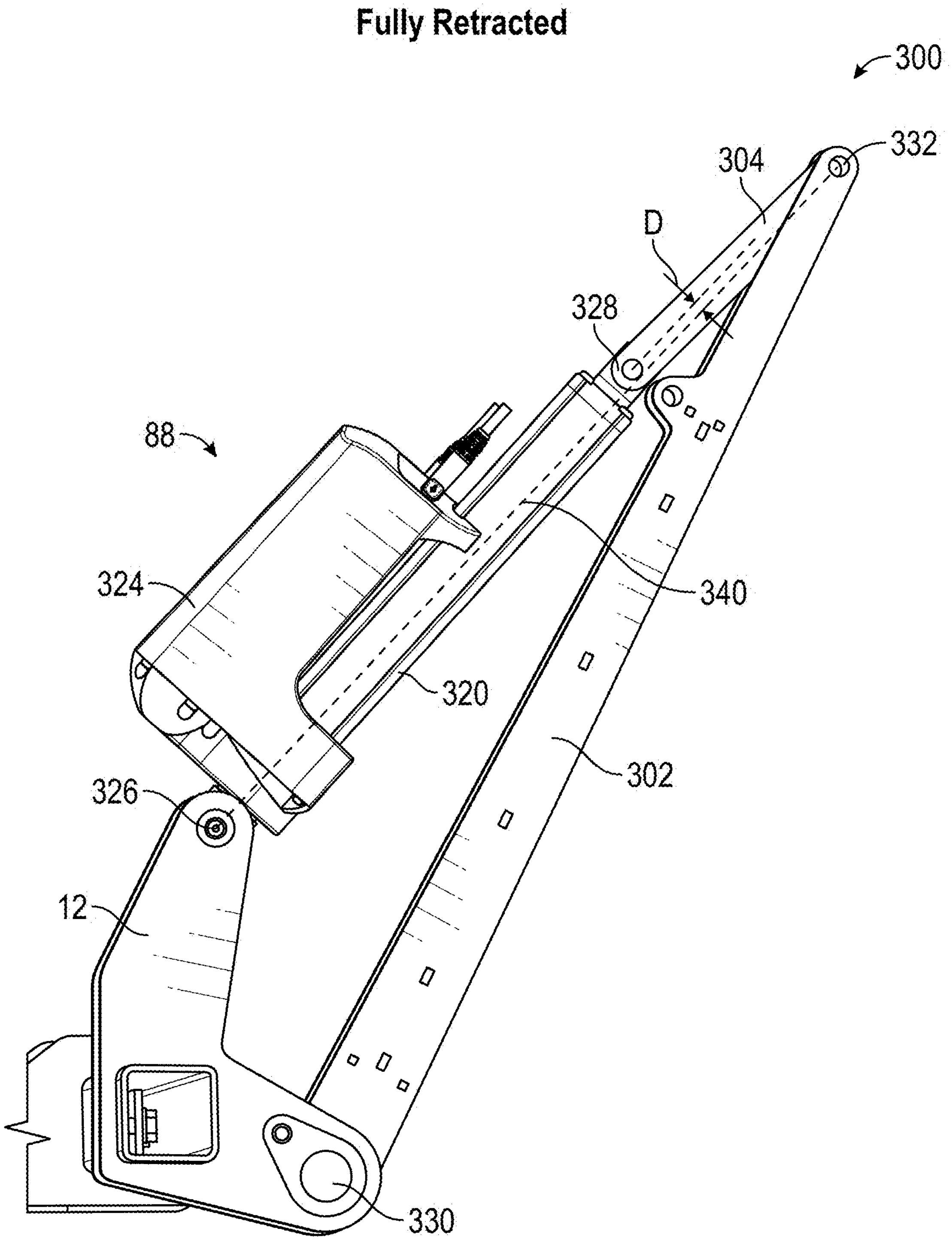
Figure 9:
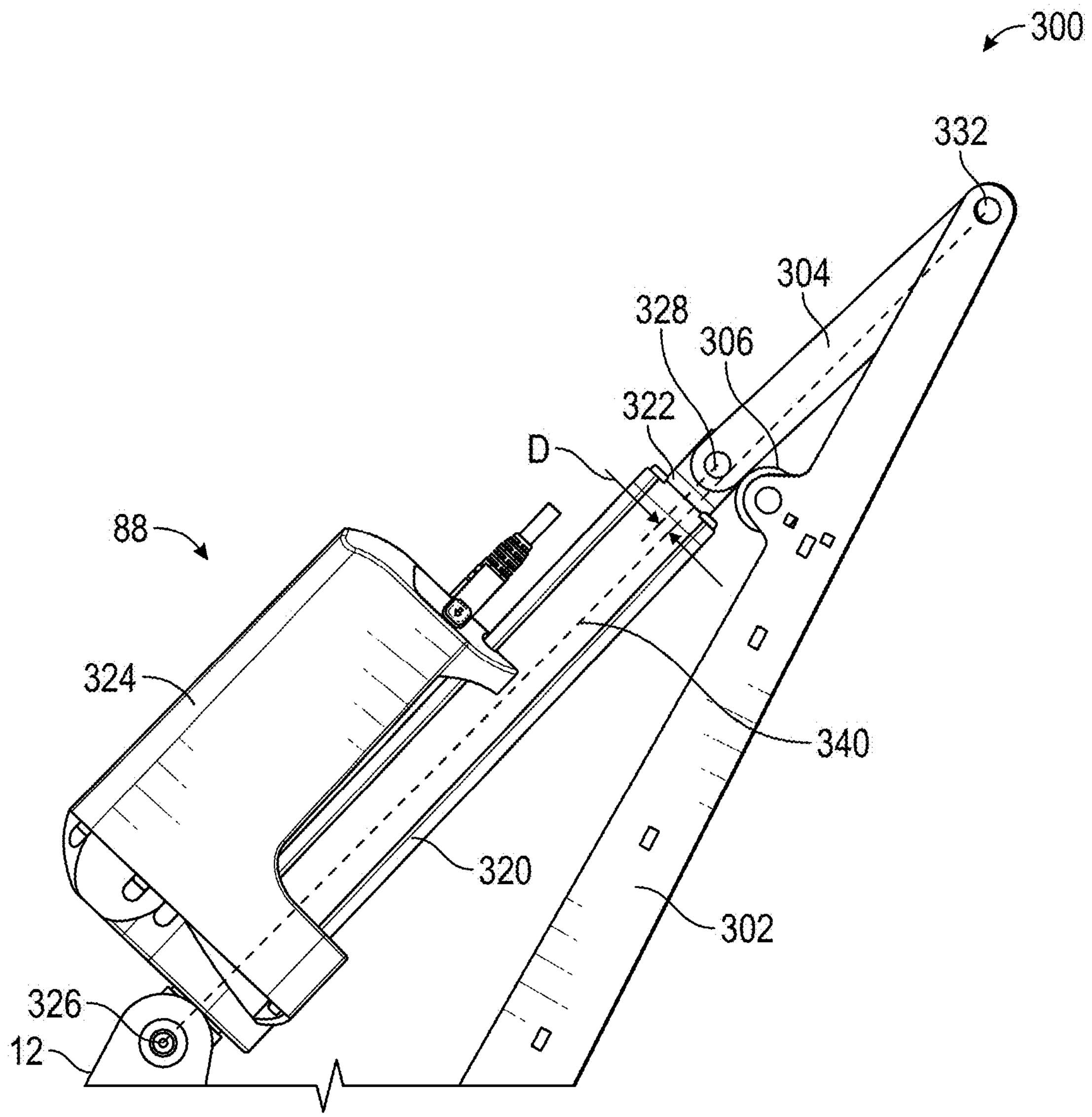

In FIGS. 8 and 9, the lift assembly 300 is shown in a fully retracted position. In the fully retracted position, the deck actuator 88 is fully retracted and the control link 304 engages the stop 306. The fully retracted position may be reached by retracting the deck actuator 88 from any other position of the lift assembly 300 (e.g., any of the positions shown in FIGS. 5-7). The deck actuator 88 may hold the lift assembly 300 in the fully retracted position until the deck actuator 88 is again extended, regardless of the external forces applied to the mower deck 80. Accordingly, the deck actuator 88 may hold the mower deck 80 stationary in the fully retracted position. In some embodiments, the fully retracted position is the highest position that can be reached by the mower deck 80.

As shown in FIGS. 5-9, throughout a range of motion of the lift assembly 300, the axis 326 and the axis 332 extend within a common plane, shown as plane 340. The plane 340 extends laterally and an angle of incline of the plane 340 varies throughout the range of motion. The axis 328 is offset a distance D above the plane 340. Although the distance D varies, the offset remains above the plane 340 throughout the range of motion of the lift assembly 300. Because this offset is above the plane 340, when an upward force is applied to the mower deck 80, a moment loading is applied to the deck actuator 88 and the control link 304 that causes the axis 328 to move upward, away from the plane 340. If the axis 328 were positioned along or below the plane 340, this moment loading would instead cause the lift assembly 300 to go over center and move the axis 328 downward, potentially damaging the lift assembly 300.

Figure 10:
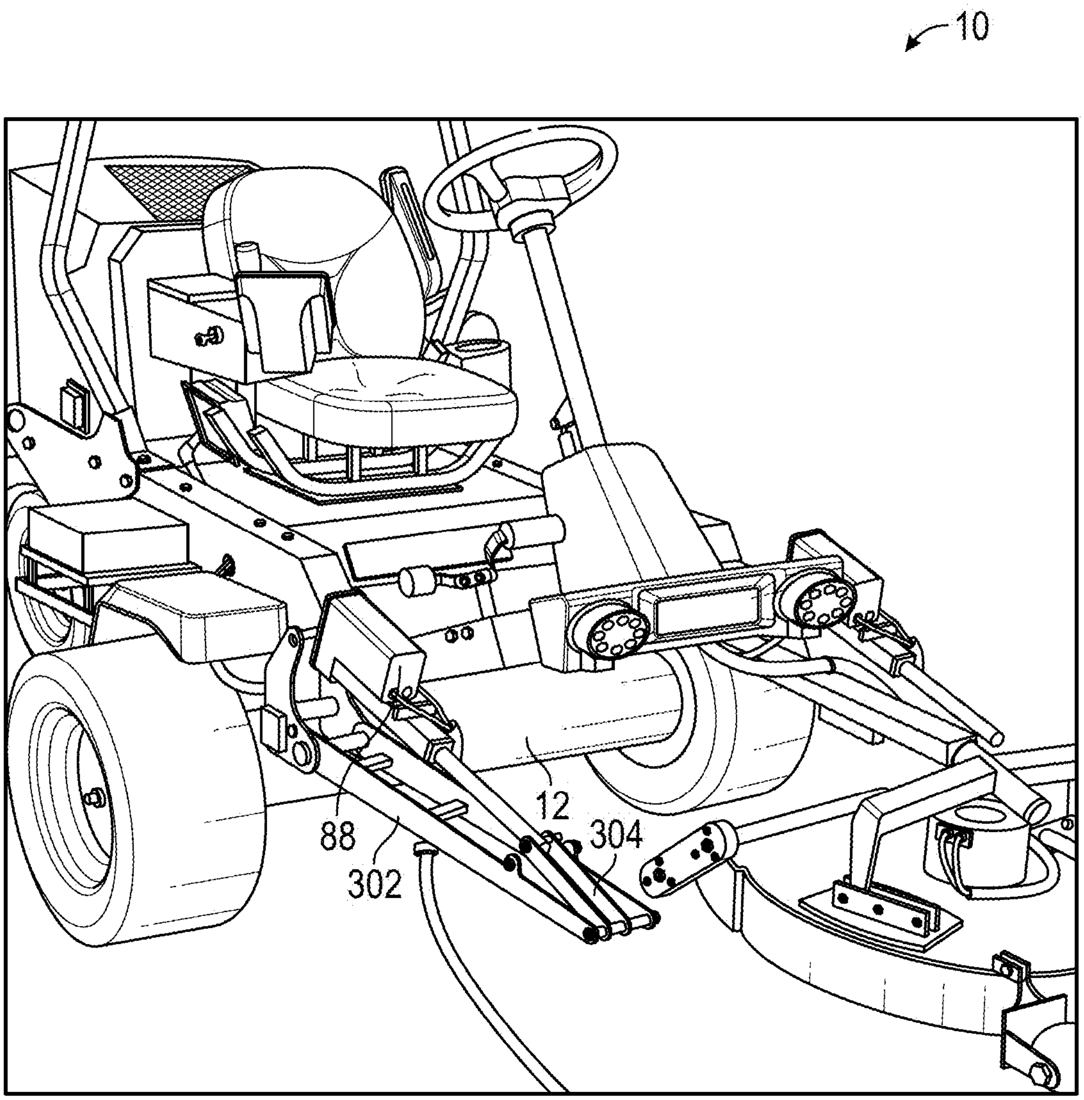
FIGS. 10-13 are perspective views of the lift assembly of FIG. 5 installed on the vehicle of FIG. 1A and moved to various positions, according to an exemplary embodiment.
Figure 11:
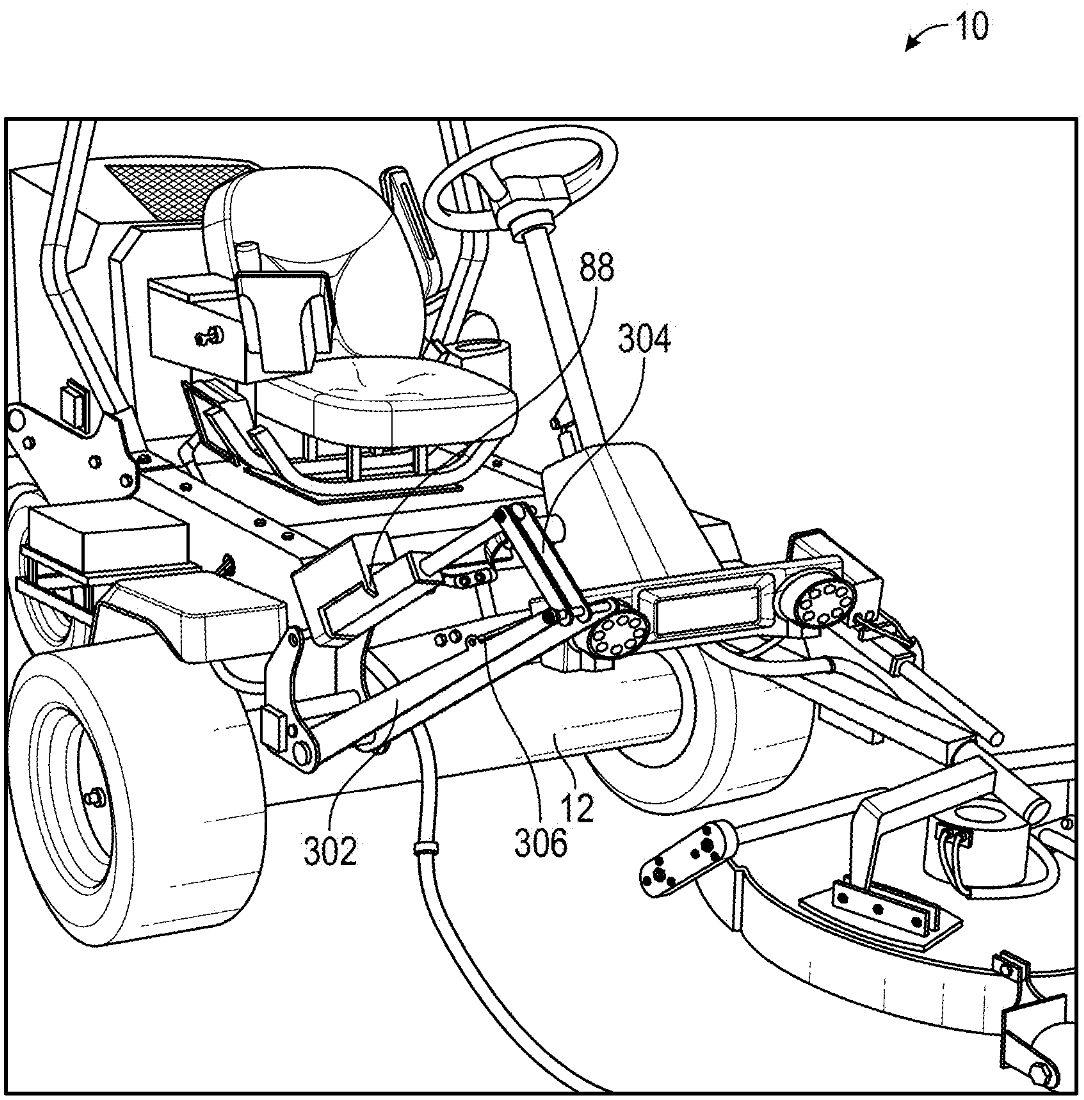
Figure 12:
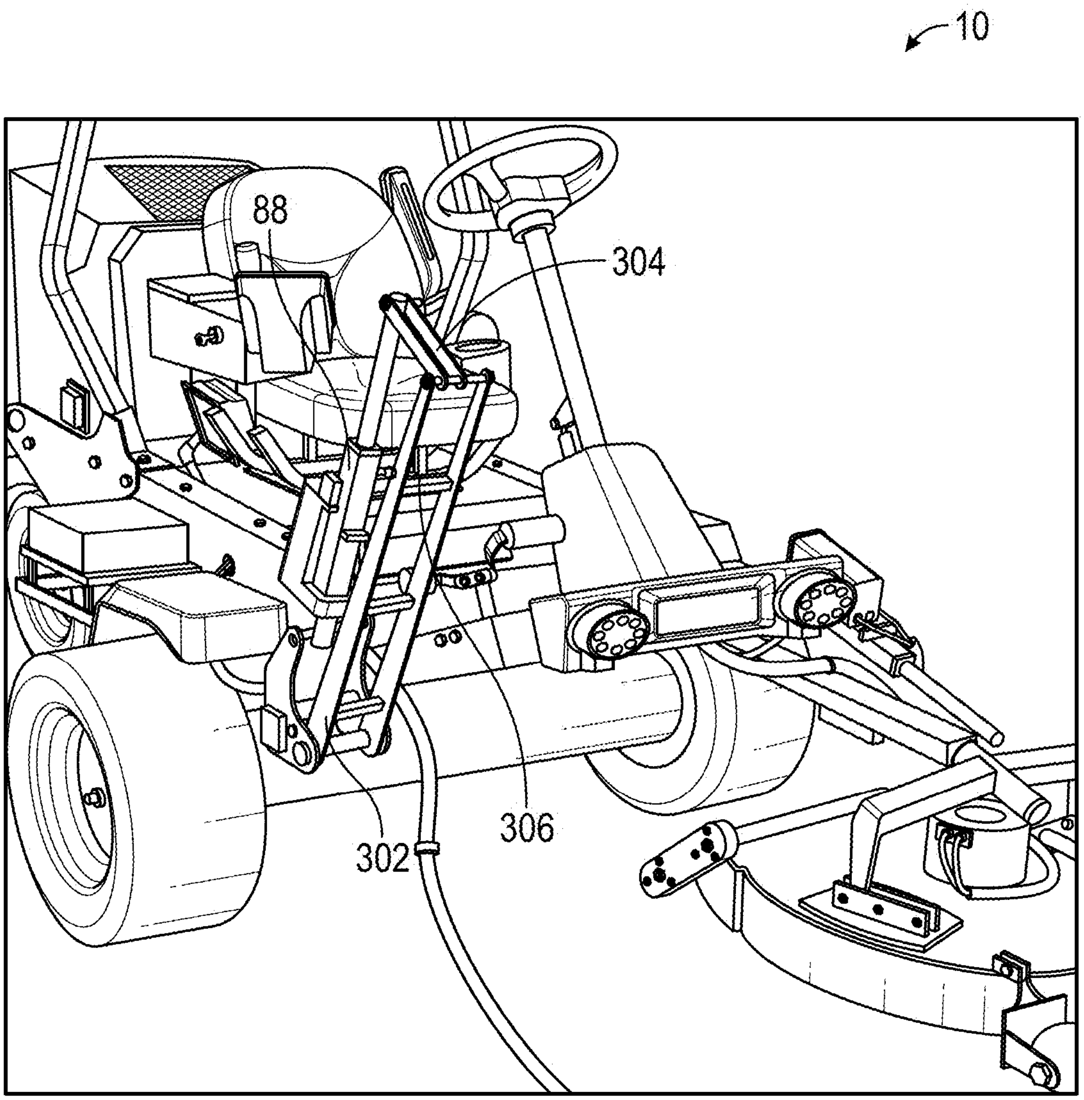
Figure 13:
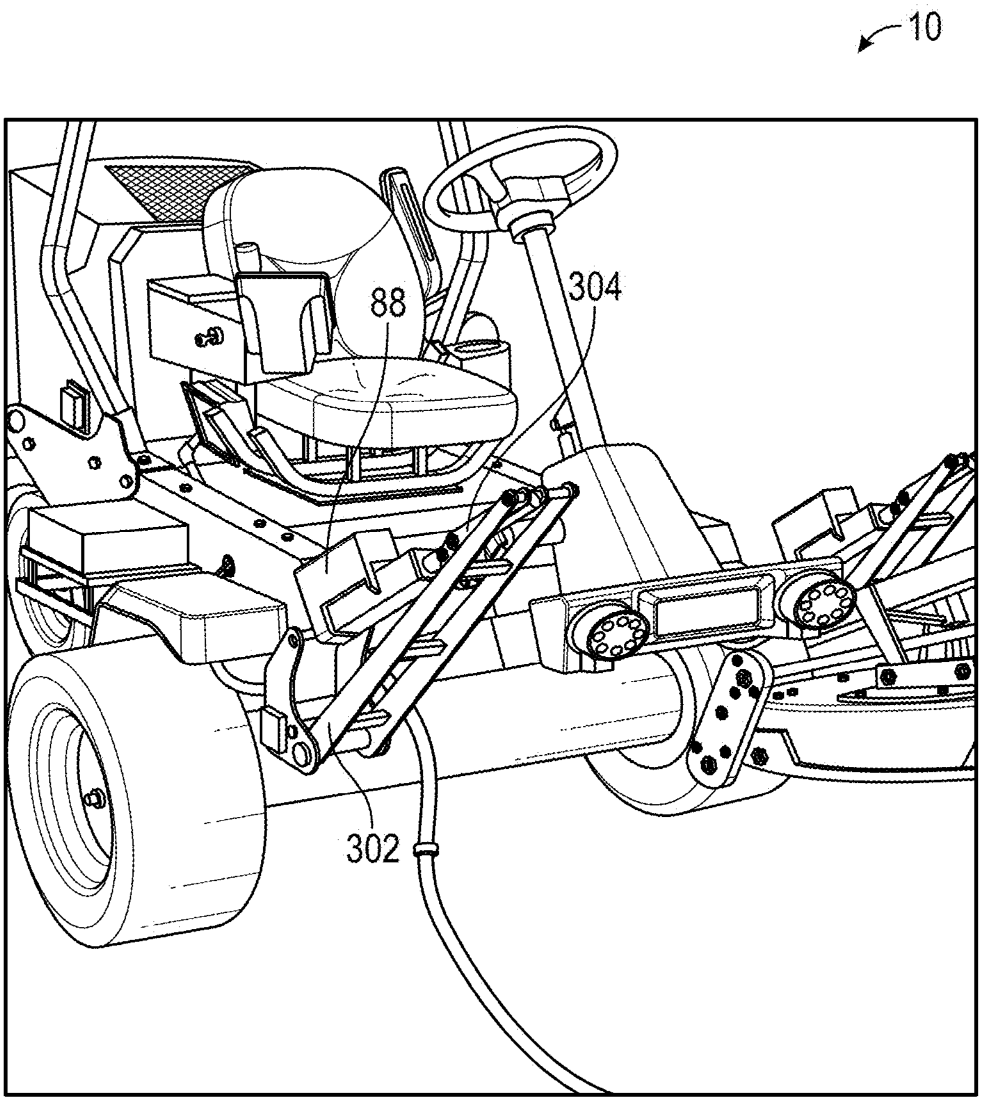

Referring to FIGS. 10-13, the lift assembly 300 is shown installed on the vehicle 10. Although a mower deck 80 is omitted for case of illustration, it should be understood that the mower deck 80 may be coupled to the support link 302. FIG. 10 illustrates the lift assembly 300 in the fully extended, fully lowered position. FIG. 11 illustrates the lift assembly 300 raised by an external force (e.g., an operator lifting the support link 302) to a fully extended, partially raised position. FIG. 12 illustrates the lift assembly 300 raised by an external force to a fully extended, fully raised position. FIG. 13 illustrates the lift assembly in a fully retracted position. In FIG. 13, the deck actuator 88 is fully retracted to hold the lift assembly 300 in the fully retracted position regardless of external forces.

Figure 14:
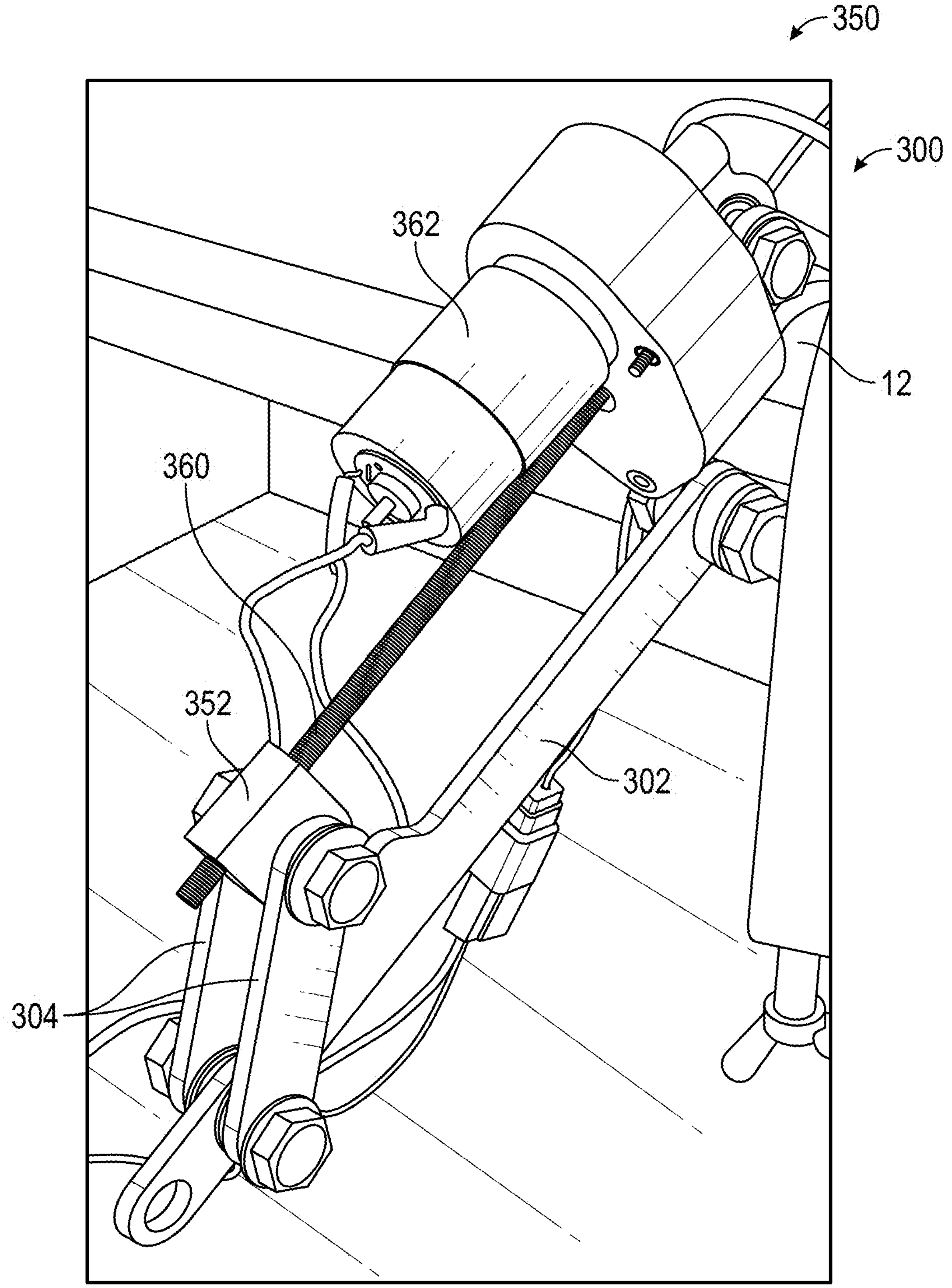
FIGS. 14-16 are perspective views of the lift assembly of FIG. 4 moved to various positions, according to another exemplary embodiment.
Figure 15:
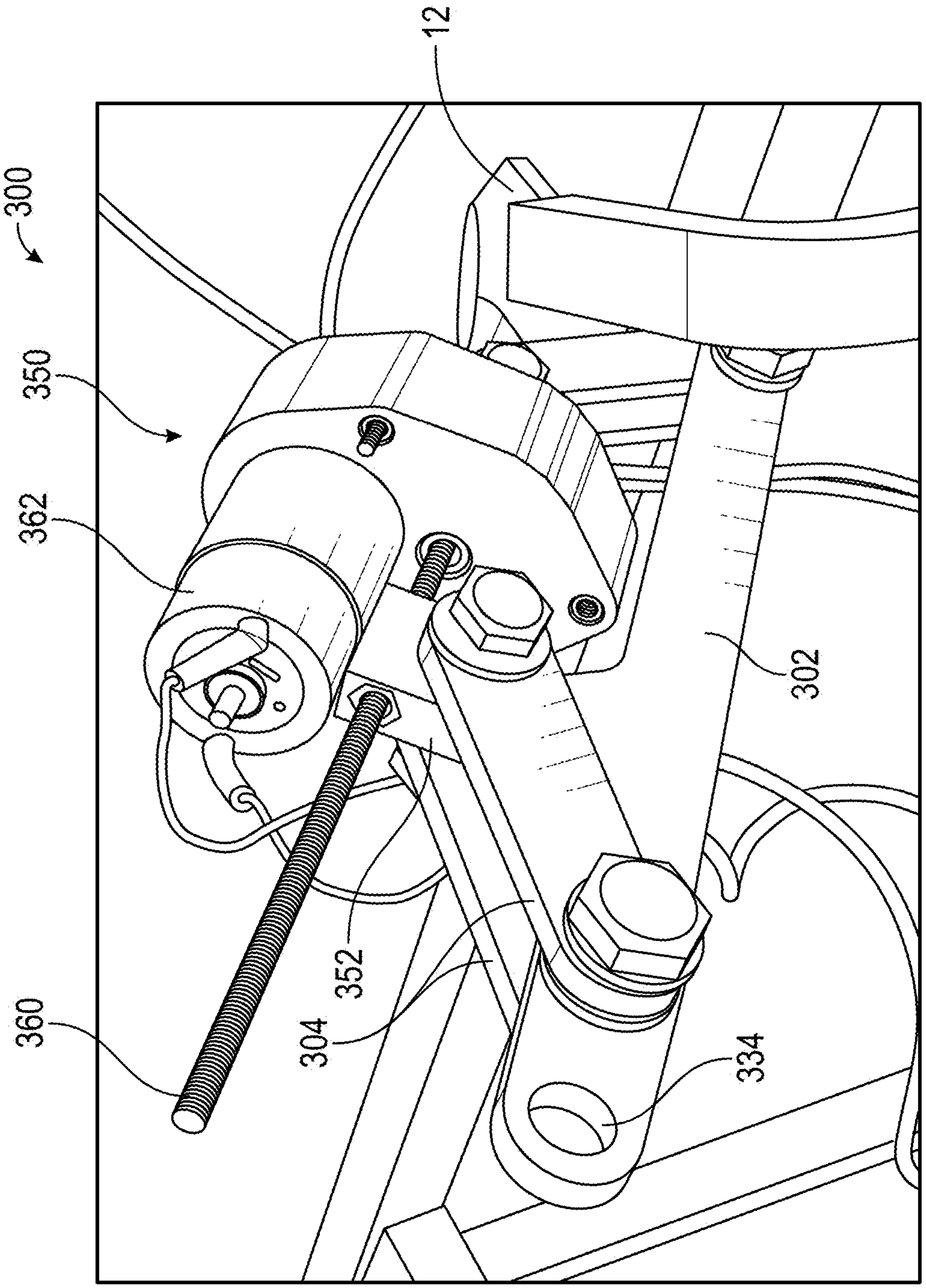
Figure 16:
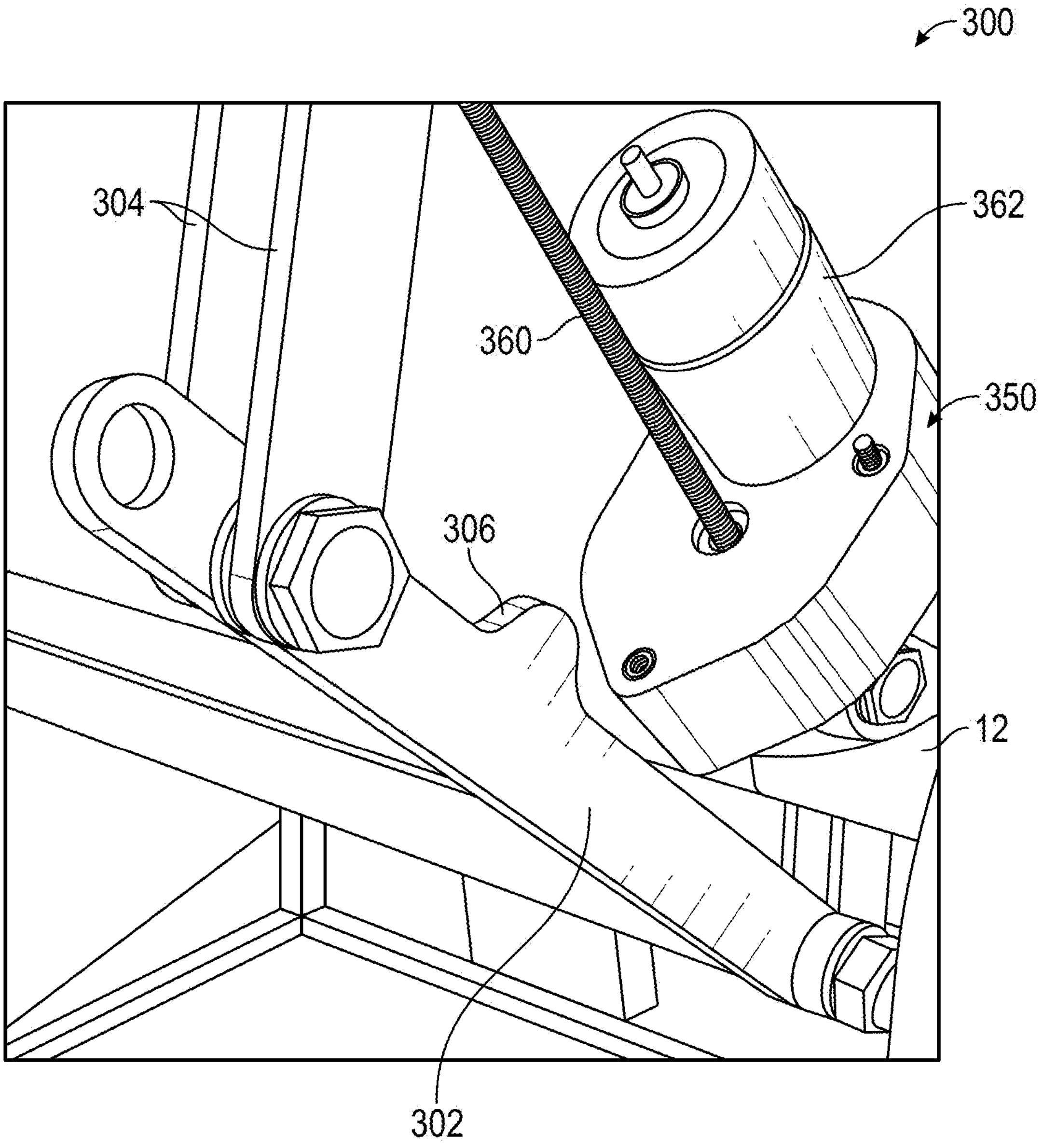

Referring to FIGS. 14-16, the lift assembly 300 is shown according to an alternative embodiment. The lift assembly 300 of FIGS. 14-16 may be substantially similar to the lift assembly 300 of FIGS. 5-9, except as otherwise specified herein. As shown in FIGS. 14-16, the deck actuator 88 is an electric linear actuator that includes a first portion 350 pivotally coupled to the frame 12 and a second portion 352 pivotally coupled to the control link 304. The first portion 350 includes a threaded rod 360 in threaded engagement with the second portion 352 (e.g., with a nut of the second portion 352). The first portion 350 further includes an electric motor 362 that drives rotation of the threaded rod 360 to cause the second portion 352 to move along a length of the threaded rod 360. The deck actuator 88 of FIGS. 14-16 may be substituted for the other deck actuators 88 discussed herein.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the vehicle controller 100, etc.) as shown in the various exemplary embodiments is illustrative only. Additionally, any element disclosed in one embodiment may be incorporated or utilized with any other embodiment disclosed herein. By way of example, a vehicle controller 100 may utilize both precision mowing and adaptive mowing.

The invention claimed is:

1. A mower, comprising:

a chassis;

a tractive element coupled to the chassis;

a mower deck coupled to the chassis and including a cutting element;

a floating lift assembly coupling the mower deck to the chassis, the floating lift assembly including:

a support link pivotally coupled to the chassis and coupled to the mower deck;

a control link having a first end portion pivotally coupled to the support link and a second end portion offset from the first end portion; and an actuator coupling the second end portion of the control link to the chassis; and a stop configured to limit rotation of the control link toward the support link to limit downward movement of the mower deck;

wherein the control link is configured to rotate relative to the actuator and relative to the support link to permit upward movement of the mower deck;

wherein the stop is coupled to the support link and configured to engage the control link; and wherein the control link is configured to move away from the stop during the upward movement of the mower deck.

2. The mower of claim 1, wherein the actuator is a linear actuator having a first portion pivotally coupled to the chassis and a second portion pivotally coupled to the control link, wherein the first portion of the linear actuator is slidable relative to the second end portion of the linear actuator to move the control link toward the chassis.

3. The mower of claim 2, wherein the control link is configured to rotate relative to the linear actuator and relative to the support link to permit the upward movement of the mower deck while a length of the linear actuator remains constant.

4. The mower of claim 2, wherein the linear actuator is configured to retract to raise the mower deck.

5. The mower of claim 2, further comprising a controller operatively coupled to the linear actuator, wherein the controller is configured to control the linear actuator to retract the linear actuator in response to a command from an operator to raise the mower deck.

6. The mower of claim 2, wherein the linear actuator includes an electric motor configured to vary a length of the linear actuator by moving the first portion of the linear actuator relative to the second portion of the linear actuator.

7. The mower of claim 1, wherein the support link is configured to rotate relative to the chassis about a first axis, wherein the actuator is configured to rotate relative to the chassis about a second axis, and wherein the second axis is above the first axis.

8. The mower of claim 1, wherein the actuator is configured to rotate relative to the chassis about a first axis, wherein the control link is configured to rotate relative to the support link about as second axis, wherein the actuator is configured to rotate relative to the control link about a third axis, and wherein the third axis is offset above a plane containing the first axis and the second axis.

9. The mower of claim 8, wherein the floating lift assembly is movable throughout a range of motion, and wherein the third axis is offset above the plane containing the first axis and the second axis throughout the range of motion of the floating lift assembly.

10. The mower of claim 1, wherein the mower deck is pivotally coupled to the support link and rotatable relative to the support link about an axis of rotation that extends horizontally.

* * * * *